(12) United States Patent
Ookawa et al.

(10) Patent No.: US 7,369,357 B2
(45) Date of Patent: May 6, 2008

(54) MAGNETIC HEAD, HEAD SUSPENSION ASSEMBLY, MAGNETIC REPRODUCTION APPARATUS, AND METHOD OF MANUFACTURING MAGNETIC HEAD

(75) Inventors: Masaki Ookawa, Ome (JP); Takayuki Yamamoto, Ome (JP); Koji Sonoda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 11/189,982

(22) Filed: Jul. 27, 2005

(65) Prior Publication Data

US 2006/0044679 A1   Mar. 2, 2006

(30) Foreign Application Priority Data

Aug. 31, 2004   (JP)   ............................. 2004-253279

(51) Int. Cl.
*G11B 5/187* (2006.01)
(52) U.S. Cl. ..................................................... 360/122
(58) Field of Classification Search ................ 360/122, 360/126
See application file for complete search history.

(56) References Cited

U.S. PATENT DOCUMENTS

| 5,858,471 | A | 1/1999 | Ray et al. |
| 6,110,329 | A | 8/2000 | Holleck et al. |
| 6,565,718 | B1 | 5/2003 | Chour et al. |
| 7,262,131 | B2* | 8/2007 | Narasimhan et al. ........ 438/643 |
| 2004/0052004 | A1 | 3/2004 | Nakayama |
| 2004/0133903 | A1* | 7/2004 | Hayakawa ................... 720/651 |
| 2005/0006768 | A1* | 1/2005 | Narasimhan et al. ........ 257/751 |
| 2005/0024790 | A1 | 2/2005 | Pinarbasi |
| 2005/0280934 | A1 | 12/2005 | Nakayama |
| 2006/0071592 | A1* | 4/2006 | Narasimhan et al. ........ 313/506 |
| 2006/0159844 | A1* | 7/2006 | Moriwaki et al. ........... 427/127 |
| 2006/0193111 | A1* | 8/2006 | Han ............................ 361/683 |
| 2007/0115589 | A1* | 5/2007 | Hunag et al. ............. 360/235.1 |

FOREIGN PATENT DOCUMENTS

| EP | 0 643 385 A2 | 3/1995 |
| JP | 2002-279605 | 9/2002 |
| WO | WO 95/19852 | 7/1995 |
| WO | WO 95/23878 | 9/1995 |

\* cited by examiner

*Primary Examiner*—Allen Cao
(74) *Attorney, Agent, or Firm*—Pillsbury Winthrop Shaw Pittman, LLP

(57) ABSTRACT

A magnetic head for use in the vicinity of a magnetic recording medium, comprising a substrate, a close contact layer laminated on the substrate, and a protective layer which is laminated on the close contact layer and which faces the magnetic recording medium, the protective layer comprising a first layer formed by laminating a laminate material on the close contact layer at a first bias voltage by a filtered cathodic vacuum arc (FCVA) process, and a second layer formed by laminating the laminate material on the first layer by the FCVA process at a second bias voltage which is higher than the first bias voltage.

20 Claims, 2 Drawing Sheets

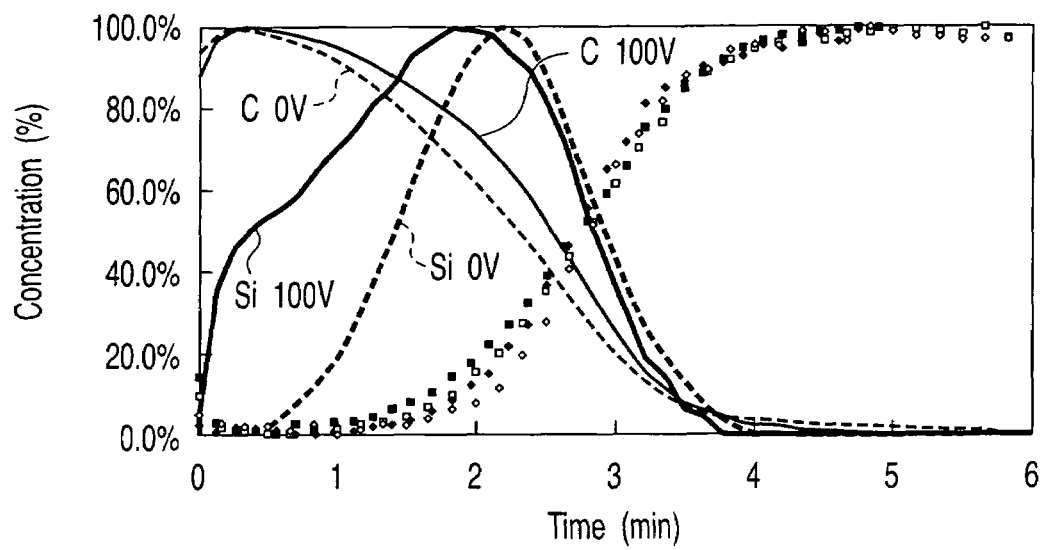
F I G. 4
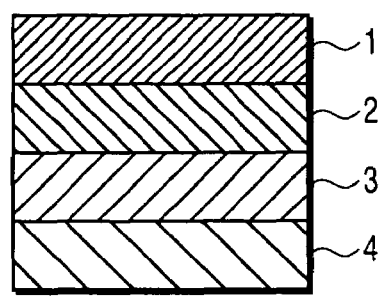
F I G. 3
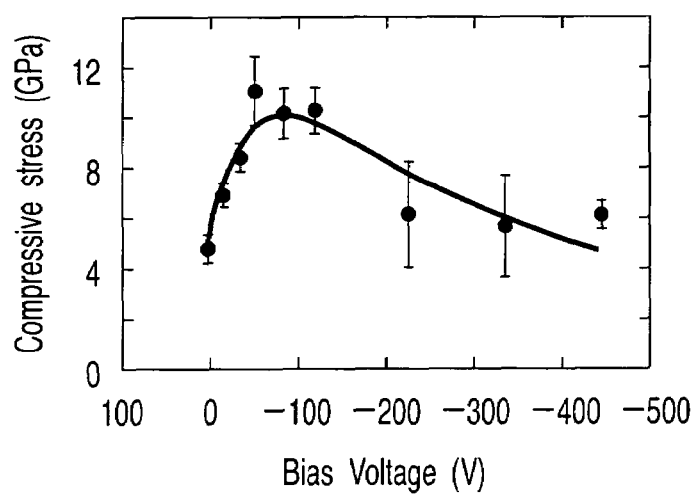
F I G. 5

MAGNETIC HEAD, HEAD SUSPENSION ASSEMBLY, MAGNETIC REPRODUCTION APPARATUS, AND METHOD OF MANUFACTURING MAGNETIC HEAD

CROSS-REFERENCE TO RELATED APPLICATIONS

This application is based upon and claims the benefit of priority from prior Japanese Patent Application No. 2004-253279, filed Aug. 31, 2004, the entire contents of which are incorporated herein by reference.

BACKGROUND OF THE INVENTION

1. Field of the Invention

The present invention relates to a magnetic head for use in a magnetic disk drive such as a hard disk drive (HDD), a head suspension assembly on which this magnetic head is mounted, and a magnetic reproduction apparatus.

2. Description of the Related Art

As a rule, a protective film for preventing wear is formed on the surface of a magnetic head for use in a hard disk drive or the like (see, e.g., Jpn. Pat. Appln. KOKAI Publication No. 2002-279605). In a technique described in this document, a silicon film is formed on a substrate of the magnetic head by a sputtering process, a DLC film is formed on the silicon film by a CVD process, and a ta-C film is formed on the DLC film by a filtered cathodic vacuum arc (FCVA) process. Consequently, defects of the ta-C film inferior in step coverage are reduced.

Additionally, a silicon film is formed as a close contact layer on an air bearing surface (ABS) of the magnetic head, and the protective film is formed on the silicon film by the FCVA process in some case. In this case, when a high bias voltage is applied in order to enhance hardness, the silicon film is mixed with a carbon (C) film, and Si moves toward a surface layer of the magnetic head. Therefore, resistance to wear is degraded.

In Jpn. Pat. Appln. KOKAI Publication No. 2002-279605, the CVD process is also used in addition to the FCVA process. Therefore, two film forming devices are required, and there are disadvantages such as a reduction in mass productivity and an increase in cost.

BRIEF SUMMARY OF THE INVENTION

According to an aspect of the present invention, there is provided a magnetic head for use in the vicinity of a magnetic recording medium, comprising: a substrate; a close contact layer laminated on the substrate; and a protective layer which is laminated on the close contact layer and which faces the magnetic recording medium, the protective layer comprising: a first layer formed by laminating a laminate material on the close contact layer at a first bias voltage by a filtered cathodic vacuum arc (FCVA) process; and a second layer formed by laminating the laminate material on the first layer by the FCVA process at a second bias voltage which is higher than the first bias voltage.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic diagram of the magnetic head according to one embodiment of the present invention;

FIG. 4 is a diagram showing results of measurement of a structure of a protective film cases where a bias voltage is set to zero and 100 V; and FIG. 5 is a diagram showing the relationship between the bias voltage and hardness.

DETAILED DESCRIPTION OF THE INVENTION

Figure 1:
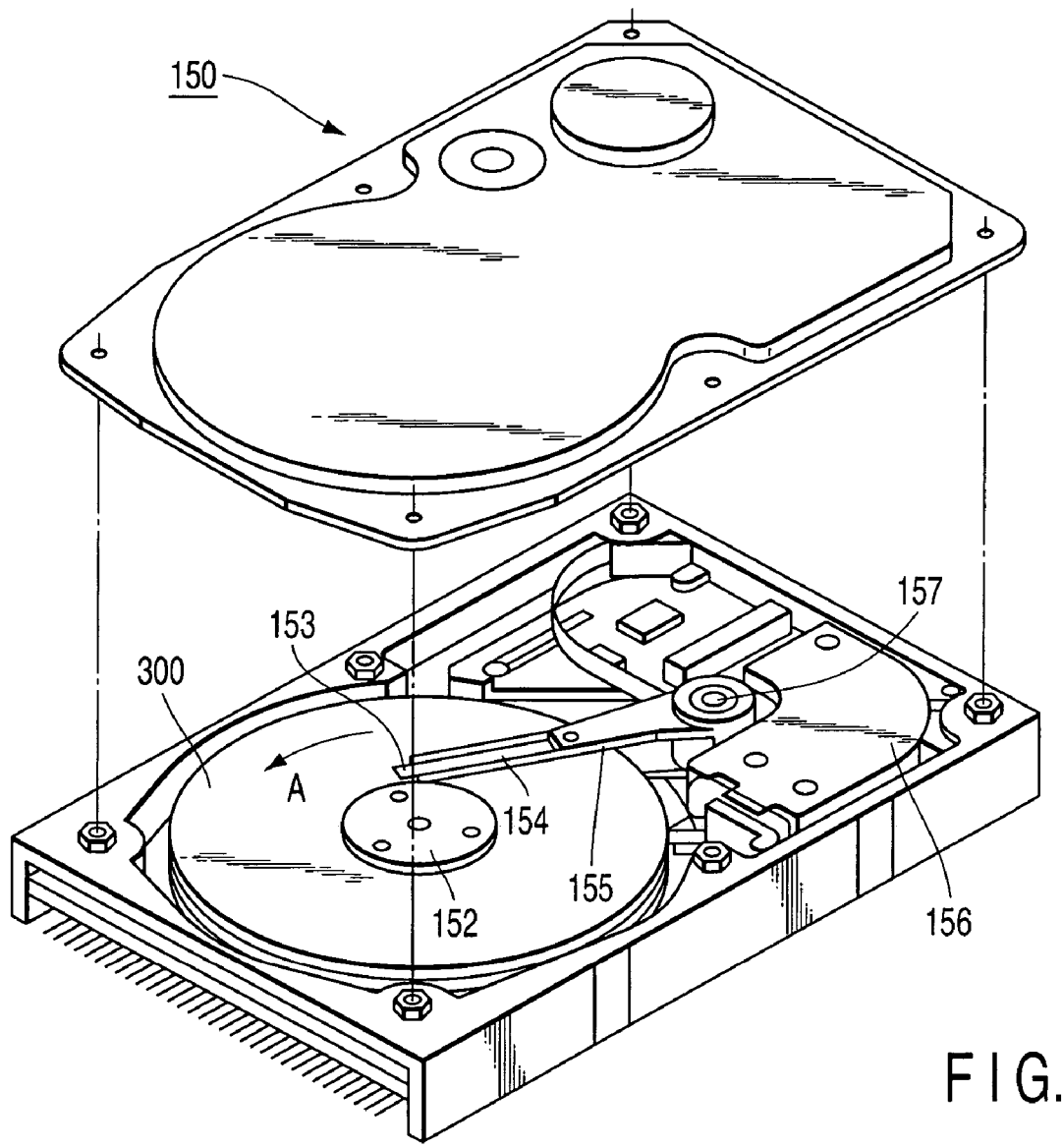
FIG. 1 is a perspective view showing a hard disk drive on which a magnetic head can be mounted according to an embodiment of the present invention.

FIG. 1 is a perspective view showing a hard disk drive on which a magnetic head can be mounted according to an embodiment of the present invention. The magnetic head according to the present invention can be mounted on a magnetic reproduction apparatus which reads digital data magnetically recorded on a magnetic recording medium. As the magnetic recording medium, a platter built into the hard disk drive is typical. Furthermore, the magnetic head according to the present invention may be mounted on a magnetic recording/reproducing apparatus which also has a function of writing the digital data to the magnetic recording medium.

In a hard disk drive 150 of FIG. 1, a magnetic head is moved using a rotary actuator. In FIG. 1, a disc medium 200 for recording is attached to a spindle 152. This disc medium 200 is rotated in the direction of arrow A by a motor (not shown) which responds to a control signal from a driving device control section (not shown). It is to be noted that a plurality of disc mediums 200 may be provided, and this type of device is referred to as a plural platter type.

A head slider 153 is attached to a tip of a thin film suspension 154, and stores information on the disc medium 200, or reproduces information recorded on the disc medium 200. A magnetic head according to the present embodiment is mounted in the vicinity of the tip of the head slider 153.

When the disc medium 200 rotates, the surface (ABS) of the head slider 153 facing the medium floats up from the surface of the disc medium 200 by a certain height. It is to be noted that the magnetic head of the present invention is applicable to a so-called contact running type apparatus whose slider is brought into contact with the disc medium 200.

The suspension 154 is connected to one end of the actuator arm 155 having a bobbin portion (not shown) which holds a driving coil (not shown) and the like. The other end of the actuator arm 155 is provided with a voice coil motor 156 which is one type of linear motor. The voice coil motor 156 comprises the driving coil (not shown) wound on the bobbin portion of the actuator arm 155, and a magnetic circuit in which a permanent magnet is disposed in such a manner as to face an opposed yoke via the coil.

The actuator arm 155 is held by ball bearings (not shown) disposed on two portions of upper and lower portions of a spindle 157 in such a manner as to be freely rotatable/slidable by the voice coil motor 156.

Figure 2:
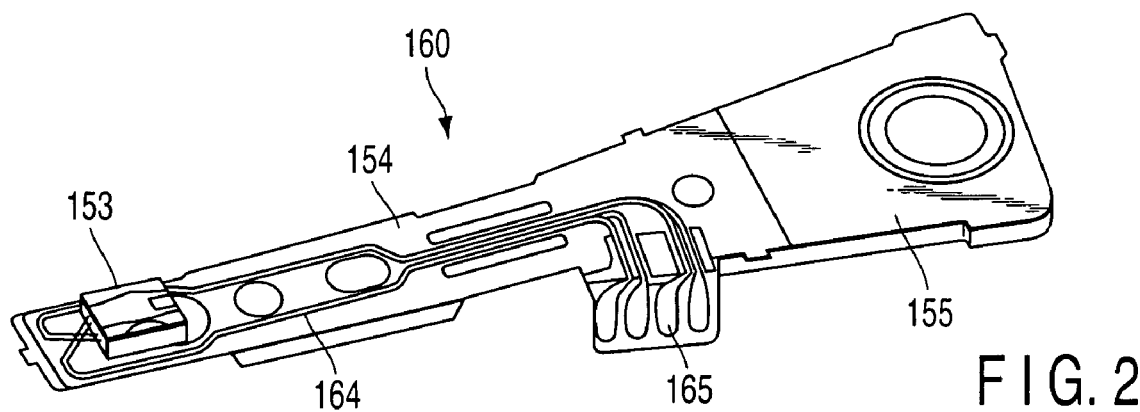
FIG. 2 is an enlarged perspective view of a tip portion of a magnetic head assembly 160 from an actuator arm 155 in the hard disk drive of FIG. 1 as viewed from a disk side.

FIG. 2 is an enlarged perspective view of a tip portion of a magnetic head assembly 160 from the actuator arm 155 in the hard disk drive of FIG. 1 as viewed from a medium side.

In FIG. 2, the magnetic head assembly 160 has the actuator arm 155. One end of the actuator arm 155 is connected to the suspension 154. The head slider 153 is attached to a tip of the suspension 154. The suspension 154 has a lead wire 164 for writing and reading a signal. The lead wire 164 is electrically connected to each electrode of the magnetic head incorporated in the head slider 153. The lead wire 164 is also connected to each of electrode pads 165.

FIG. 3 is a schematic diagram of the magnetic head according to one embodiment of the present invention. In FIG. 3, a substrate 4, a silicon film 3, a lower-layer tetrahedral amorphous carbon (ta-C film) 2, and an upper-layer ta-C film 1 are laminated in this order. Among the films, the ta-C film 1 faces a disc medium (not shown). The silicon film 3 is formed by a sputtering process. The lower-layer ta-C film 2 and the upper-layer ta-C film 1 are formed by an FCVA process.

The FCVA process is a film forming method in which a target is allowed to perform arc discharge, accordingly ionized particles are generated, and the particles only are guided to the substrate 4. Since impurities generated simultaneously with plasmas are trapped in a filter (not shown) having a three-dimensional structure disposed between the target and the substrate 4, it is possible to form a ta-C film having a high purity. A ta-C film having a very high density and hardness can also be formed.

In the FCVA process, when a bias voltage is applied, film hardness can be improved. The bias voltage is applied to the substrate 4. Carbon ions produced by the arc discharge are accelerated by the bias voltage, and bonded onto the silicon film 3. Both of an sp2 bond and an sp3 bond exist in the structure, and the ratio between the bonds changes in accordance with the bias voltage. The sp2 bond constitutes a graphite structure, and the sp3 bond constitutes a diamond structure.

When the bias voltage increases, the ratio of the sp3 bond increases. Therefore, the hardness of the protective film can be further enhanced. However, when the bias voltage is increased to accelerate the carbon ions excessively, the silicon film 3 is mixed with carbon, Si moves toward a surface layer, and resistance to wear drops.

To solve the problem, in the present embodiment, first the bias voltage is set to zero (ground potential), and the lower-layer ta-C film 2 is formed on the silicon film 3 provided on the substrate 4 by the FCVA process. When the bias voltage is set to zero, the silicon film 3 can be prevented from being mixed with carbon.

FIG. 4 is a diagram showing results of measurement of a structure of the protective film by auger electron spectroscopy (AES) in a case where the bias voltage is set to zero and 100 V. In FIG. 4, the left side of the abscissa corresponds to a front surface side of a protective film, and the right side of the abscissa corresponds to a substrate 4 side. It is seen from this graph that Si has a broad peak on the left side in a case where the bias voltage is 100 V (solid line in the figure). This indicates that a large amount of Si exists in the vicinity of the front surface, that is, the mixing is caused.

On the other hand, it is seen that Si hardly exists in the vicinity of the front surface, and Si exists under the protective film in a case where the bias voltage is zero (broken line in the figure). This experiment result has demonstrated that when the bias voltage is set to 0 V, the atoms of the silicon film are prevented from being mixed with those of the ta-C film.

Additionally, it is difficult to obtain a sufficient hardness at a bias voltage of zero. To solve the problem, the upper ta-C film layer 1 is formed on the lower ta-C film layer 2 at a high bias voltage. That is, when the protective film is formed into a double layer structure, the hardness can be improved. FIG. 5 quotes FIG. 1 in pages 1111 to 1114 of the Journal of Non-Crystalline Solids 164 to 166 (1993), and it is seen that highest hardness is obtained in the vicinity of a bias voltage of 100 V.

In the present embodiment, the silicon film 3 is formed on the substrate 4 of the magnetic head by the sputtering process as described above. Next, the lower-layer ta-C film 2 is formed on the silicon film 3 by the FCVA process at a bias voltage of zero, and is accordingly prevented from being mixed with the silicon film 3. Furthermore, the upper-layer ta-C film 1 is formed on the lower-layer ta-C film 2 by the FCVA process at the high bias voltage.

Accordingly, a carbon protective film is formed into the double layer structure. That is, the carbon protective film is provided with a first layer formed by the FCVA process at a low bias voltage, and a second layer formed by the FCVA process at a high bias voltage. The first layer has a structure different from that of the second layer in accordance with the bias voltage, and the second layer has a hardness higher than that of the first layer. In this constitution, since the first layer brought into close contact with the silicon film is formed at a low bias, the first layer is not mixed with the silicon film. Since the second layer is separated from the silicon film via the first layer, the second layer is not mixed with the silicon film. Consequently, it is possible to form a protective film having excellent resistance to wear. Furthermore, since the protective layer can be formed using the FCVA process only, mass productivity is not impaired.

As shown in FIGS. 1 and 2, when the hard disk drive is realized using the magnetic head of FIG. 3, it is possible to realize a hard disk drive having enhanced resistance to wear compared with existing hard disk drives. Additionally, magnetic recording density is further enhanced, and a further increase in recording capacity can be enabled. Consequently, there can be provided a magnetic head having a protective film superior in resistance to wear, a head suspension assembly provided with the magnetic head, a magnetic reproduction apparatus, and a method of manufacturing the magnetic head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A magnetic head for use in the vicinity of a magnetic recording medium, comprising:
   a substrate;
   a close contact layer laminated on the substrate; and
   a protective layer which is laminated on the close contact layer and which faces the magnetic recording medium,
   the protective layer comprising:
   a first layer formed by laminating a laminate material on the close contact layer at a first bias voltage by a filtered cathodic vacuum arc (FCVA) process; and
   a second layer formed by laminating the laminate material on the first layer by the FCVA process at a second bias voltage which is higher than the first bias voltage.

2. The magnetic head according to claim 1, wherein the first bias voltage is ground potential.

3. The magnetic head according to claim 1, wherein the close contact layer is a silicon film, and the protective layer is a ta-C film.

4. The magnetic head according to claim 3, wherein the silicon film is formed by laminating silicon on the substrate in accordance with a sputtering process.

5. The magnetic head according to claim 3, wherein the second layer contains carbon having more sp3 bonds than the first layer.

6. A head suspension assembly comprising the magnetic head according to claim 1, and a support mechanism which supports the magnetic head in such a manner as to face a recording surface of a magnetic recording medium.

7. A head suspension assembly comprising the magnetic head according to claim 2, and a support mechanism which supports the magnetic head in such a manner as to face a recording surface of a magnetic recording medium.

8. A head suspension assembly comprising the magnetic head according to claim 3, and a support mechanism which supports the magnetic head in such a manner as to face a recording surface of a magnetic recording medium.

9. A head suspension assembly comprising the magnetic head according to claim 4, and a support mechanism which supports the magnetic head in such a manner as to face a recording surface of a magnetic recording medium.

10. A head suspension assembly comprising the magnetic head according to claim 5, and a support mechanism which supports the magnetic head in such a manner as to face a recording surface of a magnetic recording medium.

11. A magnetic reproduction apparatus which reads magnetic information recorded on a magnetic recording medium by use of a magnetic head, the apparatus comprising the head suspension assembly according to claim 6.

12. A magnetic reproduction apparatus which reads magnetic information recorded on a magnetic recording medium by use of a magnetic head, the apparatus comprising the head suspension assembly according to claim 7.

13. A magnetic reproduction apparatus which reads magnetic information recorded on a magnetic recording medium by use of a magnetic head, the apparatus comprising the head suspension assembly according to claim 8.

14. A magnetic reproduction apparatus which reads magnetic information recorded on a magnetic recording medium by use of a magnetic head, the apparatus comprising the head suspension assembly according to claim 9.

15. A magnetic reproduction apparatus which reads magnetic information recorded on a magnetic recording medium by use of a magnetic head, the apparatus comprising the head suspension assembly according to claim 10.

16. A method of manufacturing a magnetic head which is used in the vicinity of a magnetic recording medium and which comprises a substrate, a close contact layer laminated on said substrate, and a protective layer which is laminated on the close contact layer and which faces the magnetic recording medium, the method comprising:

a first step of laminating a laminate material on the close contact layer at a first bias voltage by a filtered cathodic vacuum arc (FCVA) process to form a first layer on the protective layer; and a second step of laminating the laminate material on the first layer by the FCVA process at a second bias voltage which is higher than the first bias voltage to form a second layer on the protective layer.

17. The method according to claim 16, wherein the first bias voltage is ground potential.

18. The method according to claim 16, wherein the close contact layer is a silicon film, and the protective layer is a ta-C film.

19. The method according to claim 18, wherein the silicon film is formed by laminating silicon on the substrate in accordance with a sputtering process.

20. The method according to claim 18, wherein the second layer contains carbon having more sp3 bonds than the first layer.

* * * * *